Figure 1:
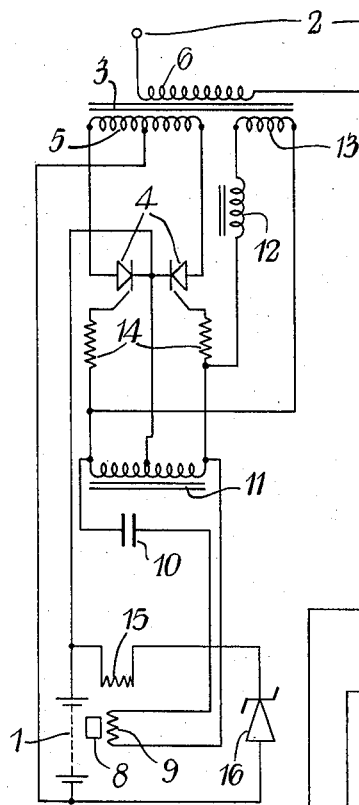

Aug. 27, 1963    H. M. HARMER    3,102,221
REGULATION OF THE CHARGING OF SECONDARY CELLS USING
A TEMPERATURE SENSITIVE ELEMENT IN HEAT EXCHANGE
RELATIONSHIP WITH A CATALYTIC DEVICE
Filed March 20, 1961    2 Sheets-Sheet 1

INVENTOR
HAROLD MARTIN HARMER

By Shoemaker and Mattare
Attys.

INVENTOR
HAROLD MARTIN HARMER

By Shoemaker and Mattare
Attys.

ntracted part of the period for which the voltage developed by half the turns of the winding 5 exceeds the battery voltage. Alternatively expressed, the diodes 4 will be triggered into conductivity later in each half cycle of the alternating current supply and the charging current supplied to the battery 1 will therefore be reduced.

United States Patent Office 3,102,221
Patented Aug. 27, 1963

3,102,221
REGULATION OF THE CHARGING OF SECONDARY CELLS USING A TEMPERATURE SENSITIVE ELEMENT IN HEAT EXCHANGE RELATIONSHIP WITH A CATALYTIC DEVICE
Harold Martin Harmer, Brentwood, England, assignor to Miranda Corporation, New York, N.Y., a corporation of New Mexico
Filed Mar. 20, 1961, Ser. No. 96,751
Claims priority, application Great Britain Mar. 24, 1960
3 Claims. (Cl. 320—36)

This invention concerns improvements relating to the regulation of the charging of one or more secondary cells from an A.C. source, utilizing as the controlling factor the temperature variation in a catalytic device, fitted to or provided in a cell, with the aid of which the hydrogen and oxygen gases produced by electrolysis are converted into water. The rise of temperature is produced by the energy released by the proportion of the charging current which is used in electrolysis in the cell and is dependent upon the rate at which the gases are produced. One manner of regulation on these lines is described in the Specification of United States patent application No. 69,636.

According to the present invention a battery-charging arrangement comprises, in combination with a battery of at least one cell, a source of alternating current and a catalytic device provided in a said cell and adapted for causing hydrogen and oxygen gas produced by electrolysis in the said cell to be converted into water, regulating apparatus comprising a temperature-sensitive resistor arranged to respond to the temperature of the catalytic device and gated diodes which are connected between the source and battery for supplying charging current to the latter and are connected also to a triggering circuit, including the resistor, for being controlled in dependence upon variation of the resistance of the said resistor in such a manner that the charging current will be reduced and/or made zero with increase of temperature of the catalyst device. By this means, the charging current can be effectively regulated or controlled in dependence upon the rate at which the gases are produced by electrolysis. By a temperature-sensitive resistor is meant one whose resistance varies with variation of its temperature. Preferably, the resistor is of the kind whose resistance decreases with increase of temperature.

In a preferred form of such arrangement, the triggering circuit is supplied from the said source of alternating current and includes reactance such that variation of the resistance of the temperature-sensitive resistor will cause a change in phase relationship between the alternating voltage applied to the gates of the diodes for triggering the latter and the alternating voltage applied to the said diodes and rectified by them for supplying charging current to the battery. Variation of the said resistance can thus be caused to result in variation of the time, per cycle of the alternating current, during which the gated diodes conduct. With variation of this time from a maximum to a minimum, the mean value of the charging current into the battery will also vary from a maximum to a minimum in dependence upon the rate of gassing.

If desired, the gated diodes may be used in conjunction with normal diodes in a rectifying brige or other like rectifying assembly.

Figure 5:
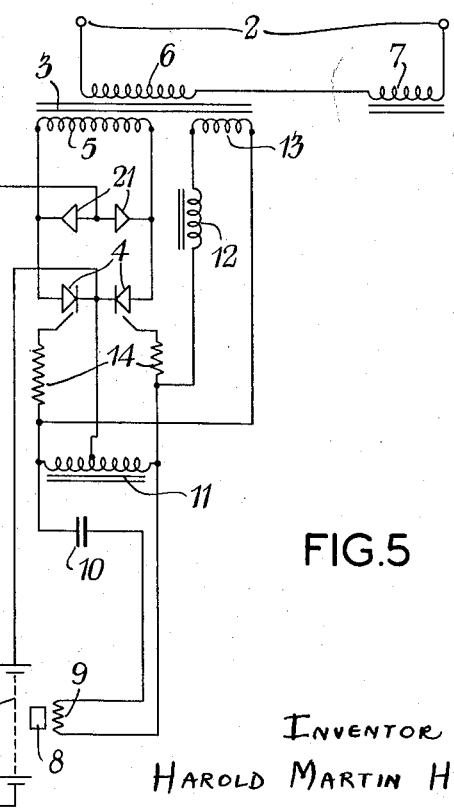
Figure 2:
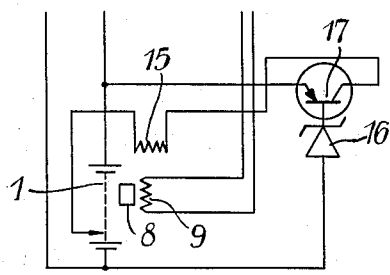
Figure 3:
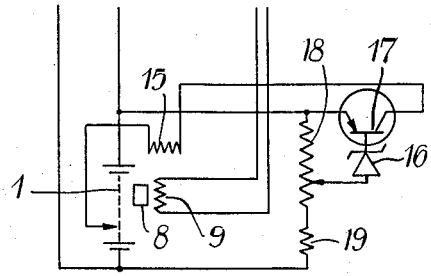
Figure 4:
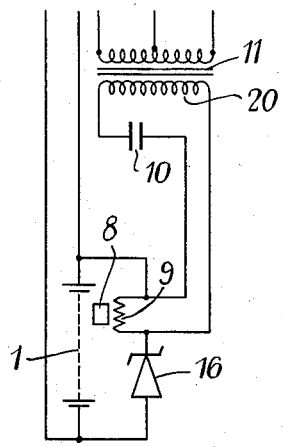

Ways of carrying the invention into effect will now be more fully described by way of example and with reference to the accompanying drawings, in which FIGURES 1 and 5 are circuit diagrams of regulated battery-charging arrangements and FIGURES 2, 3 and 4 are circuit diagrams of detail modifications.

In FIGURE 1, the secondary battery 1 is charged from a source 2 of alternating-current supply by way of a centre-tapped transformer 3 and two-gated, semi-conductor, diodes 4, the battery being connected between the centre-tapping of the secondary winding 5 of the transformer and the connected negative sides of the diodes 4. Shown in series with the primary winding 6 of the transformer is series reactance 7 which may be an ordinary gapped-core inductance or may be constituted by leakage reactance between the primary and secondary windings of the transformer 3. Alternatively, if it is desired to control the series reactance, use may be made of a transductor having a direct-current winding by which the controlling effect is applied.

The charging of the battery 1 is controlled in dependence upon the variation of temperature of a catalytic device 8 provided in one of the cells of the battery. The temperature variation is measured by means of a temperature-sensitive resistor 9 arranged near or in contact with the device 8. The resistor 9 is of the type in which the resistance is high when the resistor is cold and falls substantially with rise of temperature. It may be a resistance of the kind known by the registered trademark "Thermistor." Suitable forms and arrangements of protected catalytic device are described in the specifications of United Kingdom Patent No. 693,096 and applications Nos. 36,058/58, 6,332/60 and United States application No. 69,636.

The resistor 9 is connected in series with a condenser 10, across a small centre-tapped iron-cored reactance or transformer 11 having a relatively high reactance, and in series with an inductance 12 across a further secondary winding 13 of the transformer 3. The condenser 10 may be of the ordinary type with paper dielectric or of the reversible electrolytic type. The inductance 12 may be a gapped-core inductance or if required, a transductor. The gates of the diodes 4 are connected to the reactance or transformer 11 through current-limiting resistors 14. The centre-tapping of the reactance or transformer 11 is connected to the negative sides of the diodes 4. There is thus a supply, from the winding 13, to the gates of the diodes 4.

The manner of operation of the above-described arrangement will now be explained:

The voltage across the resistor 9 and condenser 10 and its phase relationship to the voltage supplied to the gated diodes 4 by the winding 5 depends upon the resistance of the resistor 9. If the value of the said resistance is high in relation to the reactances of the condenser 10 and inductance 12, the voltage across the centre-tapped transformer or reactance 11, whose reactance value is near infinity, will be substantially in phase with the said voltage supplied to the diodes 4. The diodes will therefore be triggered into conductivity over nearly the whole period for which the voltage developed by half the turns of the winding 5 exceeds the battery voltage. This will normally be the condition during the initial stages of charging, since little or no gas will be produced by electrolysis and the temperature of the catalytic device 8 and resistor 9 will be low and the resistance value of the said resistor high. The charging current supplied to the battery 1 from the winding 5 through the diodes 4 will therefore have a maximum value. This maximum value will be limited by the inductance 7.

However, as charging proceeds and the rate of gassing increases, the temperature of the catalytic device 8 and resistor 9 will rise and the resistance value of the resistor will decrease. Consequently, the resultant voltage across the resistor 9 and condenser 10 will commence increasingly to lag in relation to the voltage supplied by the winding 5. The diodes 4 will be conductive for a decreasing proportion of each half cycle of the latter voltage. The values of the components of the circuit 9, 10, 12, 13 are selected so that, when the resistance of the resistor 9 has a minimum value corresponding to a predetermined rate of gassing, the resultant voltage across the resistor 9 and condenser 10 will lag in relation to the voltage supplied by the winding 5 by an angle of more than 90°. Consequently the gated diodes 4 will become conductive only when the instantaneous value of the voltage supplied by the winding 5 is declining and becoming equal to or less than the battery voltage. Under these conditions, the mean current into the battery will approach or become zero and so remain until the catalytic device 8 and resistor 9 have cooled. As charging is completed, he time for which charging is thus interrupted will become increasingly longer. With the above-described arrangement, therefore, the battery 1 can be charged very economically and without excessive gassing.

The relationship of the maximum instantaneous value of the voltage developed by the winding 5 in each half cycle to the battery voltage governs the aforesaid period during which each pulse of charging current can flow, irrespective of the control exercised by the gates of the diodes 4. Depending upon the said relationship, safeguards may be necessary with respect to the relative sign of the power voltage supplied to the diodes 4 by the winding 5 and the gate voltages applied thereto through the current-limiting resistors 14. Thus, if the voltage supplied by the winding 5 is widely higher than the battery voltage, two separate, normal, power diodes may be connected in series with, and to conduct in the same sense as, respective gated diodes 4 and two further, small, diodes may be connected across, and so as to conduct in the opposite sense to, the respective gated diodes. These additional diodes will prevent any but a small value of reverse voltage being permitted to occur across the gated diodes 4 and will protect or cushion the latter against the effects of possibly harmful phase relationships between the voltages applied to the said diodes 4.

FIGURE 1 also illustrates a safeguard intended to come into operation, and limit the maximum voltage which can be developed across the battery 1, if the catalytic device 8 fails to operate for some reason. This consists essentially of a heating resistor 15 disposed close to the resistor 9 and connected across the battery 1 in series with a Zener diode 16. The Zener-voltage value for the diode 16 is designed to be somewhat less than the maximum voltage to be permitted across the battery 1. Then, if the battery voltage exceeds the said Zener-voltage value, a current will flow through the resistor 15 and heat the resistor 9, thereby adding to or taking the place of heating by the catalytic device 8 and causing the charging current to be reduced in the manner already explained.

The arrangement just described can be rendered more sensitive by the addition of a transistor to amplify the current in the heating resistor 15. As illustrated in FIGURE 2, a PNP transistor 17 has its emitter connected to the positive side of the battery, its base connected to the Zener-diode 16 and its collector connected through the heating resistor 15 to the negative side of the battery or, as shown, to a tapping by which a convenient number of cells is included in the emitter-collector circuit. Alternatively, the collector may be connected through the said resistor 15 to a separate source of direct current developed by rectification from the alternating-current source.

In the modification of the last-described arrangement shown in FIGURE 3, a potential-dividing resistor 18 is connected across the battery 1 and the negative side of the Zener-diode 16 is connected to the tapping point of the said resistor. The Zener-voltage value for the diode 16 can then be any convenient value less than the maximum voltage to be permitted across the battery 1. As also illustrated in FIGURE 3, part of the resistance of the potential divider 18 may consist of a temperature-sensitive resistor 19, of "Thermistor" type, arranged to be responsive to ambient or battery temperature. With this arrangement, the aforesaid permitted maximum voltage, at which the heating resistor 15 is caused to heat the resistor 9 in the event of failure of the catalytic device 8, will be automatically varied in depedence upon the resistance value of the resistor 19, that is upon ambient temperature, so that the battery will be protected against exposure to a charging voltage which may be harmful under the existing conditions of ambient or battery temperature.

As illustrated in FIGURE 4, the resistor 9 may itself be made to serve also the function of the heating resistor 15. In this case, however, the metallic connection of the components 9 and 10 to the battery 1 by way of the diodes 4 must be broken, which can readily be effected by providing the transformer 11 with a secondary winding 20 across which the said components are connected.

The arrangement shown in FIGURE 5 is similar to that of FIGURE 1, except that the winding is not centre-tapped and the battery 1 is supplied through a rectifier bridge comprising the two-gated diodes 4 and two normal power diodes 21. The manner of operation is also similar, but better use is made of the secondary winding 5 and the maximum working output voltage can be increased, if required, without increasing the reverse voltage across the gated-diodes 4. The modifications, including the Zener-diode 16, described with reference to FIGURES 1 to 4 may be applied also to the arrangement of FIGURE 5.

With the arrangement of either FIGURE 1 or FIGURE 5, a transistor or valve amplifier, with or without a Zener-diode reference and with or without voltage control, may be interposed between the temperature-sensitive resistor 9 and the circuit of the components 10 to 14 for the purpose of amplifying the initial current change due to the resistance variation produced by temperature variation of the catalyst device 8.

I claim:

1. An apparatus for regulating the charging rate of a storage cell unit, and attachable to at least one cell thereof to complete a charging circuit, comprising a charging circuit, including an alternating current source and gated diode rectifiers therein for supplying a direct charging current to the storage cell unit, and a control circuit comprising a circuit in inductive relationship to said alternating current source disposed through resistors between the gates of said diodes, a center-tapped inductance across said resistors, and a resistance-capacitance circuit containing a temperature-sensitive resistor disposed across said center-tapped inductance, whereby a difference in phase angle exists between the signal in the resistance-capacitance portion of the circuit and the signal in the diode rectifier portion of the circuit, and wherein less current flows in the charging circuit during a greater difference of the two said phase angles, and wherein a higher temperature in said resistor causes a relatively greater difference in said phase angles, and wherein the said temperature-sensitive resistor is placed in a heat-exchange relationship with a catalytic device adapted to facilitate the exothermic recombination reaction of hydrogen and oxygen into water.

2. An apparatus as defined in claim 1, containing, as a safety device, a further control circuit therein, connected in parallel with the storage cell units to be charged, said further control circuit comprising a zener diode and a heating resistor in series, so that at a predetermined voltage near the fully charged voltage of the storage cells to be charged, said zener diode is energized and a relatively great amount of current will flow in said further control circuit and thereby heat the said heating resistor which is disposed in a heat-exchanging relationship with said temperature-sensitive resistor, whereby a further increase in the differences between said phase angles will result in reducing the value of the charging current to a lower value, including substantially zero.

3. An apparatus as defined in claim 1, wherein the said temperature-sensitive resistor is made to serve the function of a heating resistor by the passage of an additional current therethrough to greatly increase its temperature, said additional current being provided by means in series with said temperature-sensitive resistor, said means adapted to be triggered or energized in response to a predetermined voltage.

References Cited in the file of this patent

UNITED STATES PATENTS

| | | |
|---|---|---|
| 2,421,523 | Rady | June 3, 1947 |
| 2,505,565 | Michel et al. | Apr. 25, 1950 |
| 2,687,449 | Gulick et al. | Aug. 24, 1954 |
| 2,709,238 | Wheat et al. | May 24, 1955 |
| 2,777,640 | Kaufman | Jan. 15, 1957 |
| 2,842,345 | Brown | July 8, 1958 |
| 2,991,160 | Claussen | July 4, 1961 |